US010640081B2

(12) United States Patent
Fukawatase et al.

(10) Patent No.: US 10,640,081 B2
(45) Date of Patent: May 5, 2020

(54) VEHICLE SEAT

(71) Applicant: TOYOTA JIDOSHA KABUSHIKI KAISHA, Toyota-shi, Aichi-ken (JP)

(72) Inventors: Osamu Fukawatase, Miyoshi (JP); Makoto Matsuzaki, Konan (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/180,270

(22) Filed: Nov. 5, 2018

(65) Prior Publication Data

US 2019/0193674 A1 Jun. 27, 2019

(30) Foreign Application Priority Data

Dec. 25, 2017 (JP) .................... 2017-248411

(51) Int. Cl.
*B60R 22/44* (2006.01)
*B60R 22/46* (2006.01)
*B60R 22/34* (2006.01)

(52) U.S. Cl.
CPC ...... *B60R 22/44* (2013.01); *B60R 2022/3402* (2013.01); *B60R 2022/4473* (2013.01)

(58) Field of Classification Search
CPC .................................................. B60R 22/44
USPC ........ 297/474, 475, 476, 477, 478, 479, 480
See application file for complete search history.

(56) References Cited

U.S. PATENT DOCUMENTS

| 6,499,554 | B1* | 12/2002 | Yano ...................... B60R 22/44 297/480 X |
| 6,655,743 | B1* | 12/2003 | Parizat ................ B60R 22/3413 297/477 X |
| 6,726,249 | B2* | 4/2004 | Yano ...................... B60R 22/46 180/268 |
| 6,910,653 | B2* | 6/2005 | Tanji ..................... B60R 22/44 297/478 X |
| 7,717,215 | B2* | 5/2010 | Tanaka ................... B60R 22/44 297/477 X |
| 8,046,136 | B2* | 10/2011 | Odate .................... B60R 22/44 297/475 X |

(Continued)

FOREIGN PATENT DOCUMENTS

| JP | 2005-186633 A | 7/2005 |
| JP | 2010-058744 A | 3/2010 |

(Continued)

*Primary Examiner* — Rodney B White
(74) *Attorney, Agent, or Firm* — Oliff PLC (57) ABSTRACT

A vehicle seat includes a seat back, a motor, a gear, a take-up device and a pre-tensioner component. The seat back extends in a seat vertical direction and supports the back area of a seat occupant. A seat back frame structures a framework of the seat back. The motor is mounted to an upper portion of the seat back frame. The gear is arranged along the seat back frame adjacent to the motor and transmits driving force from the motor. The take-up device is arranged along the seat back frame adjacent to the gear, and is provided with a spool onto which a webbing is wound. Driving force from the motor is transmitted to the take-up device via the gear. The pre-tensioner component is arranged along the seat back frame adjacent to the take-up device. When activated, the pre-tensioner component forcibly takes up the spool.

15 Claims, 8 Drawing Sheets

(56) References Cited

U.S. PATENT DOCUMENTS

| | | | | |
|---|---|---|---|---|
| 8,091,821 B2 * | 1/2012 | Burkart | ............ | B60R 21/01548 297/477 X |
| 8,165,758 B2 * | 4/2012 | Odate | ................. | B60R 22/46 297/475 X |
| 8,579,066 B2 * | 11/2013 | Odate | ................. | B60R 22/46 297/477 X |
| 2006/0006269 A1 * | 1/2006 | Wier | ................. | B60R 22/44 242/374 |
| 2006/0220368 A1 * | 10/2006 | Takao | ................. | B60R 22/44 297/477 X |
| 2006/0231664 A1 * | 10/2006 | Takao | ................. | B60R 22/44 242/374 |
| 2006/0237570 A1 * | 10/2006 | Takao | ................. | B60R 22/44 242/374 |
| 2008/0203808 A1 * | 8/2008 | Yoshioka | ................. | B60R 22/405 297/478 |
| 2010/0066150 A1 * | 3/2010 | Mori | ................. | B60R 22/46 297/475 |
| 2011/0031800 A1 * | 2/2011 | Motozawa | ................. | B60R 22/4628 297/475 |
| 2011/0140504 A1 * | 6/2011 | Bolton | ................. | B60R 22/02 297/477 |
| 2011/0278905 A1 * | 11/2011 | Ikeda | ................. | B60R 22/34 297/475 |
| 2014/0375109 A1 * | 12/2014 | Jayasuriya | ................. | B60R 22/12 297/475 |
| 2016/0311398 A1 * | 10/2016 | Osaki | ................. | B60R 22/44 |
| 2016/0347277 A1 * | 12/2016 | Nagata | ................. | B60R 22/44 |
| 2018/0361975 A1 * | 12/2018 | Nagata | ................. | B60R 22/44 |

FOREIGN PATENT DOCUMENTS

| | | |
|---|---|---|
| JP | 2013-035391 A | 2/2013 |
| JP | 2013-121784 A | 6/2013 |

\* cited by examiner

VEHICLE SEAT

CROSS-REFERENCE TO RELATED APPLICATION

This application is based on and claims priority under 35 USC 119 from Japanese Patent Application No. 2017-248411 filed on Dec. 25, 2017, the disclosure of which is incorporated by reference herein.

BACKGROUND

Technical Field

The present disclosure relates to a seat for a vehicle.

Related Art

Japanese Patent Application Laid-Open (JP-A) No. 2005-186633 discloses a structure in which a retractor with a pre-tensioner and a motor are disposed adjacent to one another inside a seat cushion that structures a vehicle seat.

In JP-A No. 2005-186633, because the retractor (take-up device) and motor are disposed in the seat, a seat occupant may be restrained even if the orientation of the seat is altered. However, a shoulder belt is arranged to pass through the interior of the seat. Therefore, there are numerous inflection points in the webbing and frictional resistance when the webbing is being pulled out is large. In contrast, if a retractor (take-up device) and motor are disposed in an upper portion of a seat back, there are fewer inflection points in a webbing. However, a design surface of the upper portion of the seat back bulges. Therefore, there is scope for improvement in regard to assuring flexibility in aesthetic design.

SUMMARY

The present disclosure provides a vehicle seat, in which a take-up device and a motor are mounted in the seat, from which a webbing may be pulled out smoothly and that may assure flexibility in aesthetic design.

A vehicle seat according to a first aspect includes: a seat back extending in a seat vertical direction and supporting a dorsal region of a seat occupant; a motor mounted to an upper portion of a seat back frame configuring a framework of the seat back; a gear arranged along the seat back frame adjacent to the motor, the gear transmitting driving force from the motor; a take-up device arranged along the seat back frame adjacent to the gear, the take-up device being provided with a spool onto which a webbing is wound, and driving force from the motor being transmitted to the take-up device via the gear; and a pre-tensioner component arranged along the seat back frame adjacent to the take-up device, the pre-tensioner component forcibly rotating the spool when activated.

In this vehicle seat, the motor is attached to the upper portion of the seat back frame and the gear is disposed adjacent to the motor. The take-up device is disposed adjacent to the gear, and the spool onto which the webbing is wound is provided at the take-up device. The pre-tensioner component is disposed adjacent to the take-up device; the pre-tensioner component is configured to forcibly turn the spool when activated. Thus, because the motor, gear, take-up device and pre-tensioner component are disposed in the upper portion of the seat back, there may be fewer inflection points in the webbing than in a structure in which these components are disposed in a lower portion of a seat back or in a seat cushion.

The motor, gear, take-up device and pre-tensioner component are arranged along the seat back frame. Therefore, a bulge in a design surface of the upper portion of the seat back may be smaller than in a structure in which these components are disposed to be arrayed in a direction away from the seat back frame.

In a vehicle seat according to a second aspect, in the first aspect, the motor is disposed at a front face side of the seat back frame, and the take-up device and the pre-tensioner component are disposed at a back face side of the seat back frame.

In this vehicle seat, because both the front face side and back face side of the seat back frame have bulging forms, bulging of the seat back may be made less obvious. Because the pre-tensioner component is disposed at the back face side of the seat back frame, the pre-tensioner component may be made more distant from a seat occupant than in a structure in which a pre-tensioner component is disposed at the front face side of a seat back frame. Therefore, when the pre-tensioner component is at a high temperature at a time of activation due to a low explosive or the like, transmission of heat to the seat occupant may be suppressed. This aspect is not limited to structures in which the whole of the motor is disposed at the front face of the seat back. Structures in which the motor is disposed to the front face side relative to the center of the seat back in the seat front-and-rear direction are to be broadly encompassed. Further, this aspect is not limited to structures in which the whole of the take-up device and the pre-tensioner component are disposed at the back face of the seat back. Structures in which the take-up device and pre-tensioner component are disposed to the back face side relative to the center of the seat back in the seat front-and-rear direction are to be broadly encompassed.

In a vehicle seat according to a third aspect, in the first aspect, the motor, the gear, the take-up device and the pre-tensioner component are arrayed in the seat vertical direction at a back face side of the seat back frame.

In this vehicle seat, the motor, gear, take-up device and pre-tensioner component may be made more distant from a seat occupant than in a structure in which these components are disposed at the front face side of a seat back frame. As a result, transmission to the seat occupant of vibrations and noise produced from the motor, the gear and the take-up device may be suppressed. Transmission of heat to the seat occupant at a time of activation of the pre-tensioner component may also be suppressed.

In a vehicle seat according to a fourth aspect, in the first aspect, the motor, the gear and the take-up device are arrayed in a seat width direction at a back face side of the seat back frame.

In this vehicle seat, left and right bulges of the seat back may be made more similar in size than in a structure in which the motor, gear and take-up device are gathered at one side in the seat width direction of the seat back frame.

In a vehicle seat according to a fifth aspect, in any one of the first to fourth aspects, further comprising a force limiter component provided at the take-up device, the force limiter component limiting a restraining force from the webbing.

In this vehicle seat, at a time of activation of the pre-tensioner component, the force limiter component limits a restraining force on a seat occupant from the webbing.

In a vehicle seat according to a sixth aspect, in the fifth aspect, the force limiter component is arranged along the seat back frame adjacent to the spool.

In this vehicle seat, the external shape of the take-up device may be made smaller than in a structure in which a spool and a force limiter component are integrated in a take-up device. As a result, a bulge caused by the take-up device in the design surface at the upper portion of the seat back may be made smaller.

As described above, according to the vehicle seat according to the first aspect, in a vehicle seat in which a take-up device and a motor are mounted in the seat, a webbing may be pulled out smoothly and flexibility in aesthetic design may be assured.

According to the vehicle seat according to the second aspect, while flexibility in aesthetic design is assured, transmission of heat to a seat occupant at a time of activation of the pre-tensioner component may be suppressed.

According to the vehicle seat according to the third aspect, while flexibility in aesthetic design is assured, comfort of a seat occupant may be excellently maintained.

According to the vehicle seat according to the fourth aspect, design of the seat back is more likely to have left-right symmetry.

According to the vehicle seat according to the fifth aspect, seat occupant restraint performance may be excellently maintained.

According to the vehicle seat according to the sixth aspect, flexibility in aesthetic design may be improved compared to a structure in which a spool and a force limiter component are integrated.

BRIEF DESCRIPTION OF THE DRAWINGS

Exemplary embodiments of the present disclosure will be described in detail based on the following figures, wherein.

DETAILED DESCRIPTION

=First Exemplary Embodiment=

A vehicle seat 10 according to a first exemplary embodiment of the present disclosure is described below using FIG. 1 to FIG. 3. An arrow FR that is shown where appropriate in the drawings indicates a vehicle front direction, an arrow UP indicates a vehicle upper direction, and an arrow RH indicates a vehicle right direction. Below, where descriptions are given using directions to front and rear, left and right, and up and down, unless particularly specified, these refer to front and rear in the vehicle front-and-rear direction, left and right in the vehicle left-and-right direction (the vehicle width direction), and up and down in the vehicle vertical direction.

—Overall Structure of the Vehicle Seat—

Figure 1:
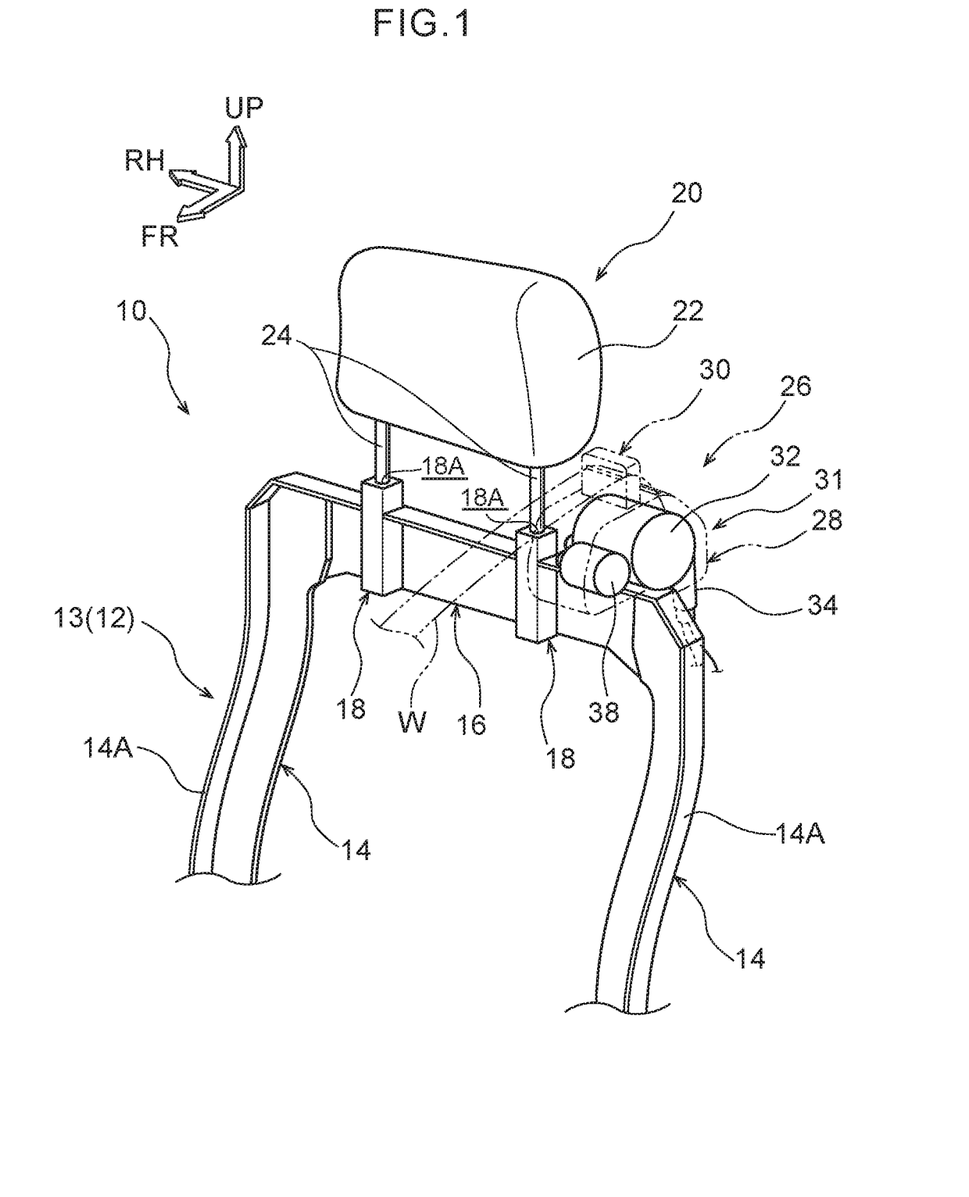
FIG. 1 is a perspective view showing the principal elements of a vehicle seat according to a first exemplary embodiment.

As shown in FIG. 1, the vehicle seat 10 according to the present exemplary embodiment is provided with a seat back 12. The seat back 12 extends in a seat vertical direction and is structured so as to support the back area of a seat occupant. A lower end portion of the seat back 12 is turnably connected to a rear end portion of a seat cushion, which is not shown in the drawings.

The seat back 12 is provided with a seat back frame 13. The seat back frame 13 is a frame that forms a framework of the seat back 12. The seat back frame 13 includes a left and right pair of side frames 14, which extend in the seat vertical direction, and an upper frame 16, which connects upper end portions of the side frames 14 with one another in a seat width direction.

Each of the left and right pair of side frames 14 extends in the seat vertical direction with a thickness direction in a seat front-and-rear direction. A side flange 14A projects to the seat front side from an end portion at the seat width direction outer side of each side frame 14. Thus, the side frame 14 is formed substantially in an "L" shape in a cross section seen from the seat upper side. As shown in FIG. 2, an inflection portion 14B is formed in an upper portion of the side frame 14. The inflection portion 14B is inflected so as to form a projection to the seat rear side. The lower side of the side frame 14 relative to the inflection portion 14B is angled to the seat front side toward the seat lower side.

As shown in FIG. 1, the upper end portions of the side frames 14 are connected to one another in the seat width direction by the upper frame 16. The upper frame 16 extends in the seat width direction with a thickness direction in the seat front-and-rear direction. Two seat width direction end portions of the upper frame 16 are superposed with rear face sides of the side frames 14 and joined thereto. An upper side flange 16A projects to the seat front side from an end portion at the seat upper side of the upper frame 16. Two seat width direction end portions of the upper side flange 16A are inflected toward the seat lower side along with the upper frame 16 and meet up with the side flanges 14A.

Stay mounting portions 18 are provided at the upper frame 16. The stay mounting portions 18 are provided as a pair spaced apart in the seat width direction. Each stay mounting portion 18 is formed in a substantially square column shape with a length direction in the seat vertical direction. Mounting holes 18A are formed in upper end faces of the stay mounting portions 18. Headrest stays 24 of a headrest 20 are inserted into the mounting holes 18A.

The headrest 20 is provided at the seat upper side relative to the seat back 12. The headrest 20 includes a headrest main body 22 and the headrest stays 24. A cushion pad is provided inside the headrest main body 22 and is capable of supporting the head area of a seat occupant from the seat rear side. The pair of headrest stays 24 project toward the seat lower side from a lower face of the headrest main body 22. The headrest stays 24 are formed in substantially circular rod shapes with length directions in the seat vertical direction. Lower end portions of the headrest stays 24 are inserted into the stay mounting portions 18 of the seat back frame 13.

A seatbelt apparatus 26 is provided at the seat back frame 13. The seatbelt apparatus 26 is described below.

—Seatbelt Apparatus—

Figure 2:
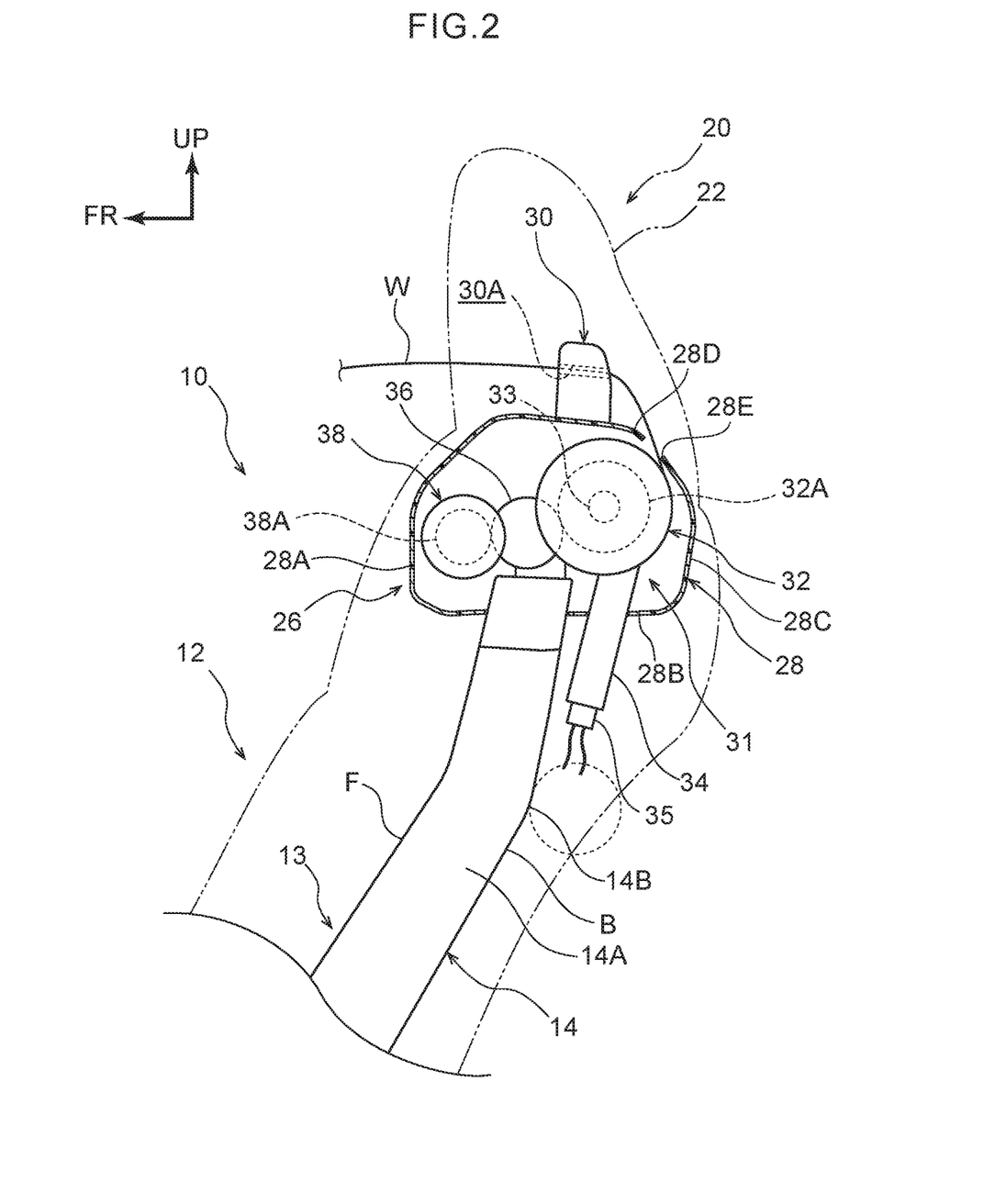
FIG. 2 is a side view showing a state in which the principal elements of the vehicle seat according to the first exemplary embodiment are seen in a partial cutaway in a seat width direction.

As shown in FIG. 2, the seatbelt apparatus 26 principally includes a case 28, a belt guide 30, a motor 38, a linking gear 36, a retractor 31 that serves as a take-up device, and a pre-tensioner component 34.

The case 28 is disposed at an upper end portion of the seat back frame 13. The case 28 is formed substantially in a box shape including a front wall portion 28A, a lower wall portion 28B, a rear wall portion 28C and an upper wall portion 28D. An aperture portion 28E is formed between the upper wall portion 28D and rear wall portion 28C of the case 28. A webbing W is pulled out to outside the case 28 through the aperture portion 28E. In this structure, the belt guide 30 is provided at the upper wall portion 28D of the case 28.

The belt guide 30 is provided upright at the upper wall portion 28D. A belt insertion hole 30A is formed penetrating through the belt guide 30 in the seat front-and-rear direction. The webbing W is inserted through the belt insertion hole 30A.

The motor 38 is disposed at a front face F side of the upper end portion of the seat back frame 13. The motor 38 is accommodated in a front portion of the interior of the case 28. A power supply, which is not shown in the drawings, is connected to the motor 38. When the power supply electrifies the motor 38, the motor 38 drives. An output shaft, which is not shown in the drawings, is provided at the motor 38 with an axial direction in the seat width direction. A motor side gear 38A is mounted to the output shaft. Thus, when the motor 38 drives, the motor side gear 38A rotates around the output shaft.

The motor side gear 38A meshes with the linking gear 36. The linking gear 36 is provided at a central portion in the seat front-and-rear direction of the interior of the case 28. The linking gear 36 is arranged along the seat back frame 13 adjacent to the motor 38. That is, the linking gear 36 is disposed at the seat rear side of the motor 38 and is rotatably mounted to the case 28. When the motor 38 drives, driving force is transmitted to the linking gear 36 meshing with the motor side gear 38A and the linking gear 36 rotates. The linking gear 36 corresponds to the "gear" relating to the present disclosure.

The linking gear 36 meshes with a retractor side gear 32A that is provided at the retractor 31. The retractor 31 is disposed at a back face B side of the upper end portion of the seat back frame 13. The retractor 31 is arranged along the seat back frame 13 adjacent to the linking gear 36. The retractor 31 includes a spool 32 and a torsion bar 33, which serves as a force limiter component.

The spool 32 is formed in a substantially circular tube shape with the axial direction in the seat width direction. The spool 32 is rotatably mounted to the case 28. The webbing W is wound onto an outer periphery face of the spool 32. From the spool 32, the webbing W passes through the aperture portion 28E of the case 28 and is inserted through the belt insertion hole 30A of the belt guide 30.

The retractor side gear 32A is provided at the spool 32. The retractor side gear 32A is provided to be coaxial with the spool 32 and is structured so as to rotate together with the spool 32. As mentioned above, the retractor side gear 32A meshes with the linking gear 36. Therefore, when the motor 38 drives, the retractor side gear 32A is rotated via the linking gear 36, and the retractor side gear 32A rotates the spool 32. That is, driving force from the motor 38 is transmitted via the linking gear 36 to the spool 32 (the retractor 31). The torsion bar 33 is mounted in the core of the spool 32.

The pre-tensioner component 34 is arranged along the seat back frame 13 adjacent to the retractor 31. To be specific, the pre-tensioner component 34 is formed in a substantially circular rod shape with a length direction in the seat vertical direction, and is arranged along the back face B of the seat back frame 13. An upper end portion of the pre-tensioner component 34 is connected to the spool 32 of the retractor 31, and a lower end portion of the pre-tensioner component 34 is connected to a connector 35. A low explosive is accommodated inside the pre-tensioner component 34. At a time of activation, the low explosive is ignited and produces a gas, forcibly rotating the spool 32 and taking up the webbing W.

The motor 38 and the pre-tensioner component 34 are electronically connected to an electronic control unit (ECU), which is not shown in the drawings. The ECU is electronically connected to a collision prediction sensor that predicts a collision and a collision detection sensor that detects a collision. When a collision is predicted by the collision prediction sensor, the ECU drives the motor 38. Hence, the driving force of the motor 38 is transmitted via the linking gear 36 to the spool 32, the spool 32 rotates, and the webbing W is taken up. When the collision is detected by the collision detection sensor, the pre-tensioner component 34 is activated, the spool 32 is momentarily rotated, and restraining force of the webbing W is increased. In the present exemplary embodiment at this time, because the torsion bar 33 is provided at the spool 32, the torsion bar 33 deforms by twisting in association with the rotation of the spool 32. Therefore, the restraining force from the webbing W may be limited. That is, when a seat occupant is moving by inertia toward the seat front side, the webbing W is loosened by the torsion bar 33. Thus, a load on the seat occupant from the webbing W may be moderated.

—Operations—

Now, operations of the present exemplary embodiment are described.

In the vehicle seat 10, the motor 38, the linking gear 36, the retractor 31 and the pre-tensioner component 34 are disposed at the upper portion of the seat back frame 13. Therefore, there may be fewer inflection points of the webbing W than in a structure in which these components are disposed at a lower portion of the seat back frame 13 or inside a seat cushion. That is, in a structure in which the retractor 31 is disposed in a lower end portion of the seat back 12, the webbing W pulled out from the retractor 31 must follow the back face B of the seat back 12 to the upper end portion of the seat back 12, which causes inflection points in the webbing W. Consequently, frictional resistance increases in correspondence with the increase in inflection points, and a seat occupant needs more strength when pulling out the webbing W.

In contrast, when the motor 38, the linking gear 36, the retractor 31 and the pre-tensioner component 34 are disposed at the upper portion of the seat back frame 13, there is no need for the webbing W to follow the back face B of the seat back 12 and there are fewer inflection points. Thus, frictional resistance is reduced and the webbing W may be pulled out smoothly.

The motor 38, the linking gear 36, the retractor 31 and the pre-tensioner component 34 are arranged along the seat back frame 13. Therefore, bulging of design surfaces of the upper portion of the seat back 12 may be minimized, in contrast to a structure in which these components are disposed to be arrayed in a direction away from the seat back frame 13. This operation is described with reference to a comparative example.

Figure 8:
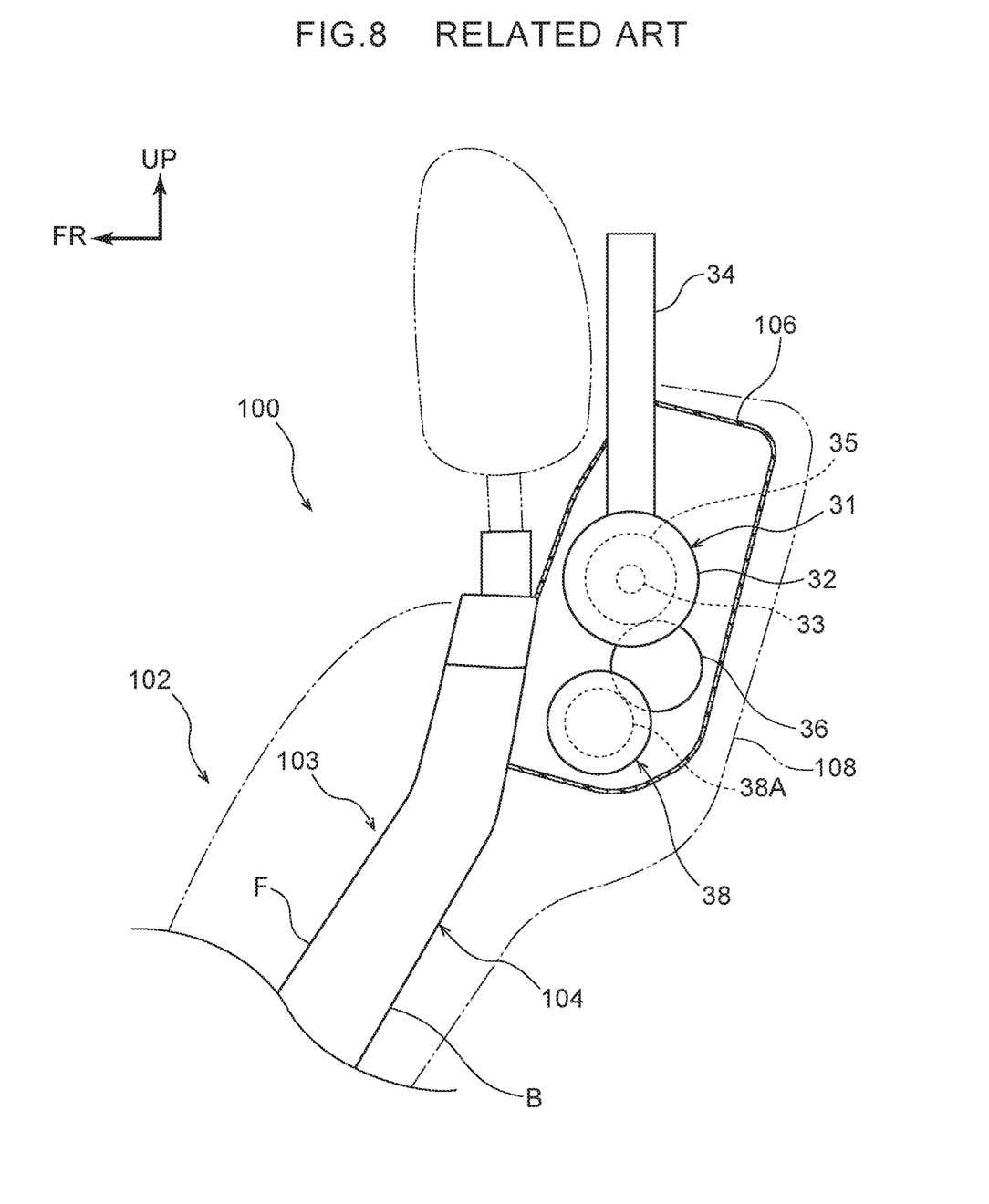
FIG. 8 is a magnified side view showing a state in which the principal elements of a vehicle seat according to a comparative example are seen in a partial cutaway in the seat width direction.

As shown in FIG. 8, a vehicle seat 100 according to the comparative example includes a seat back 102. A case 106 is mounted at a back face B side of a seat back frame 104 that structures a framework of the seat back 102. The motor 38, linking gear 36, retractor 31 and pre-tensioner component 34 are disposed inside the case 106. The motor 38, the linking gear 36, the retractor 31 and the pre-tensioner component 34 respectively have the same structures as in the present exemplary embodiment.

In a seat side view, the case 106 is formed in a substantially rectangular shape whose longer direction is in the seat vertical direction. The motor 38 is disposed in a lower end portion of the interior of the case 106. The linking gear 36 is disposed at the seat upper side of the seat rear side relative to the motor 38. The retractor 31 is disposed at the seat upper side of the seat front side relative to the linking gear 36. The pre-tensioner component 34 is connected to an upper end portion of the retractor 31.

As described above, in the vehicle seat 100 according to the comparative example, all of the motor 38, the linking gear 36, the retractor 31 and the pre-tensioner component 34 are disposed at the back face B side of the seat back frame 104. In addition, at least some of these components are disposed away from the seat back frame 104. Consequently, a bulge portion 108 at which a design surface bulges to the seat rear side is formed at an upper end portion of the seat back 102.

In contrast, as shown in FIG. 2, in the vehicle seat 10 according to the present exemplary embodiment as described above, all of the motor 38, the linking gear 36, the retractor 31 and the pre-tensioner component 34 are arranged along the seat back frame 13. Therefore, bulging of the seat back 12 may be suppressed compared to the structure of the comparative example, and flexibility in aesthetic design may be assured.

In particular in the present exemplary embodiment, the motor 38 is disposed at the front face F side of the seat back frame 13, and the retractor 31 and pre-tensioner component 34 are disposed at the back face B side of the seat back frame 13. Therefore, because a structure is formed in which both the front face F side and the back face B side of the seat back frame 13 bulge, bulging of the seat back 12 may be made less obvious.

Because the pre-tensioner component 34 is disposed at the back face B side of the seat back frame 13, the pre-tensioner component 34 may be made more distant from the seat occupant than in a structure in which the pre-tensioner component 34 is disposed at the front face side of the seat back frame 13. Therefore, when the pre-tensioner component 34 is at a high temperature at a time of activation due to a low explosive or the like, transmission of heat to the seat occupant may be suppressed. Thus, while flexibility in aesthetic design is assured, transmission of heat to a seat occupant at the time of activation of the pre-tensioner component 34 may be suppressed.

In the present exemplary embodiment, the retractor 31 is equipped with the torsion bar 33. Therefore, an excessive restraining force on the seat occupant from the webbing W at the time of activation of the pre-tensioner component 34 may be suppressed. That is, when the seat occupant is moving by inertia toward the seat front side, the webbing W is loosened by the torsion bar 33. Thus, a load on the seat occupant from the webbing W may be moderated, and seat occupant restraint performance may be excellently maintained.

In the present exemplary embodiment, the webbing W is pulled out through the belt guide 30 provided at the case 28, but this is not limiting. A structure according to a variant example illustrated in FIG. 3 may be employed.

—Variant Example—

Figure 3:
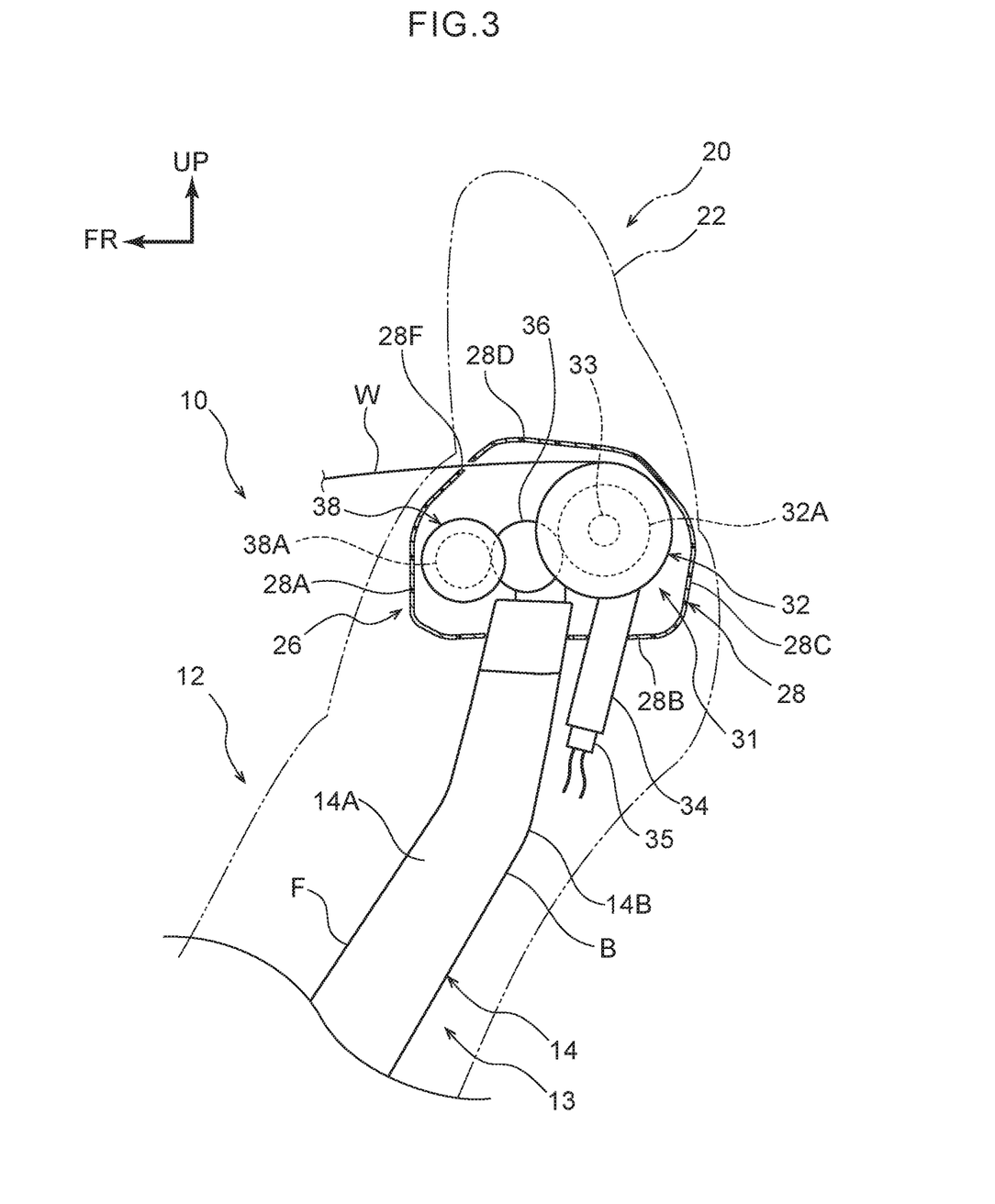
FIG. 3 is a magnified side view, corresponding with FIG. 2, showing a variant example of the vehicle seat according to the first exemplary embodiment.

As shown in FIG. 3, in the present variant example, no belt guide is provided at the case 28. The gap between the upper wall portion 28D and rear wall portion 28C of the case 28 is closed; the aperture portion 28E in FIG. 2 is not formed. In the present variant example, an aperture portion 28F is formed between the upper wall portion 28D and front wall portion 28A of the case 28. The webbing W is pulled out from the retractor 31 through the aperture portion 28F.

In the structure according to the variant example described above, there is no need to provide the belt guide 30 separately. Thus, flexibility in aesthetic design may be improved.

=Second Exemplary Embodiment=

Now, a second exemplary embodiment of the present disclosure is described with reference to FIG. 4 and FIG. 5. Structures and operations that are basically the same as in the first exemplary embodiment are assigned the same reference symbols as in the first exemplary embodiment and are not described.

Figure 4:
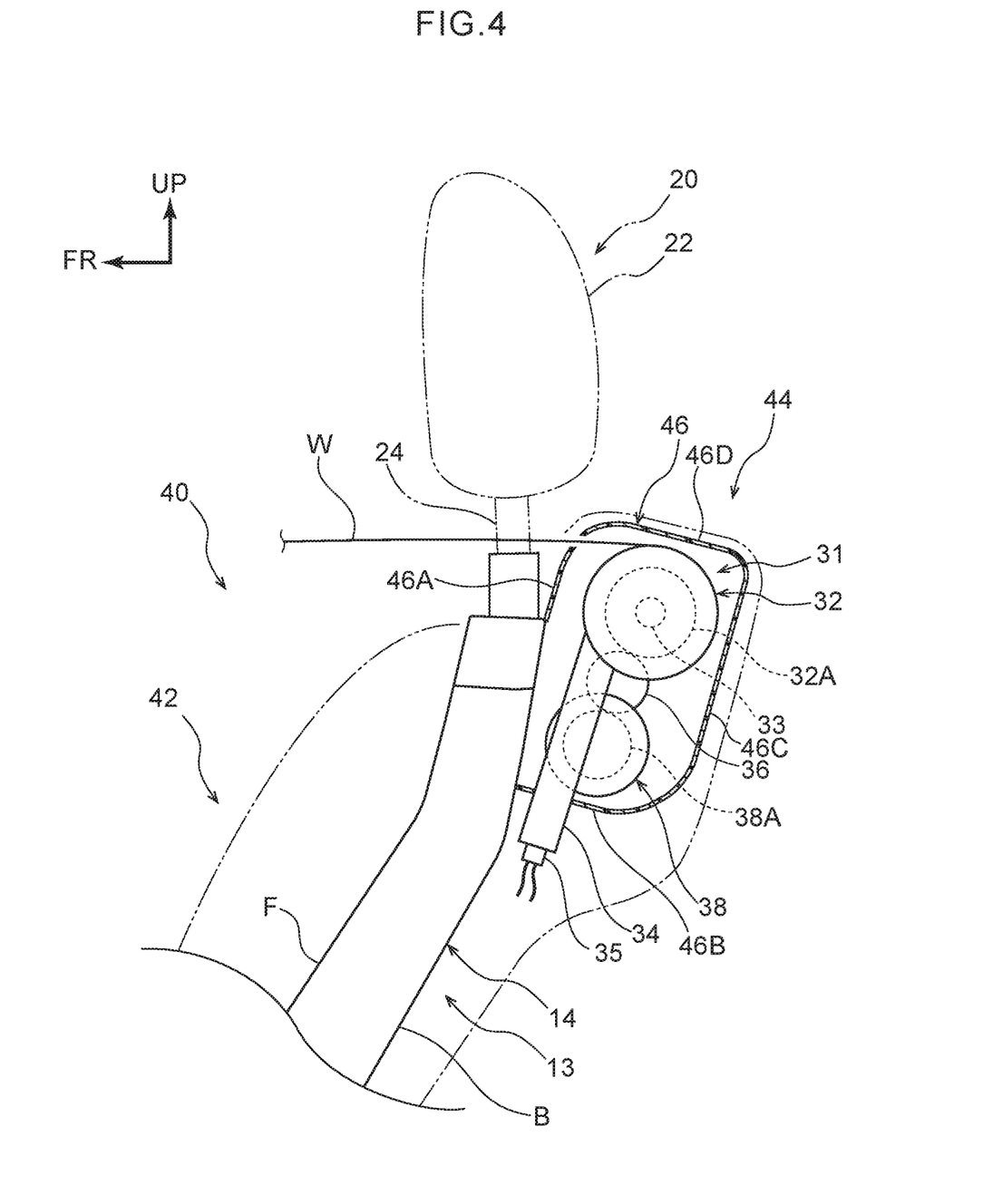
FIG. 4 is a magnified side view showing a state in which the principal elements of a vehicle seat according to a second exemplary embodiment are seen in a partial cutaway in the seat width direction.
Figure 5:
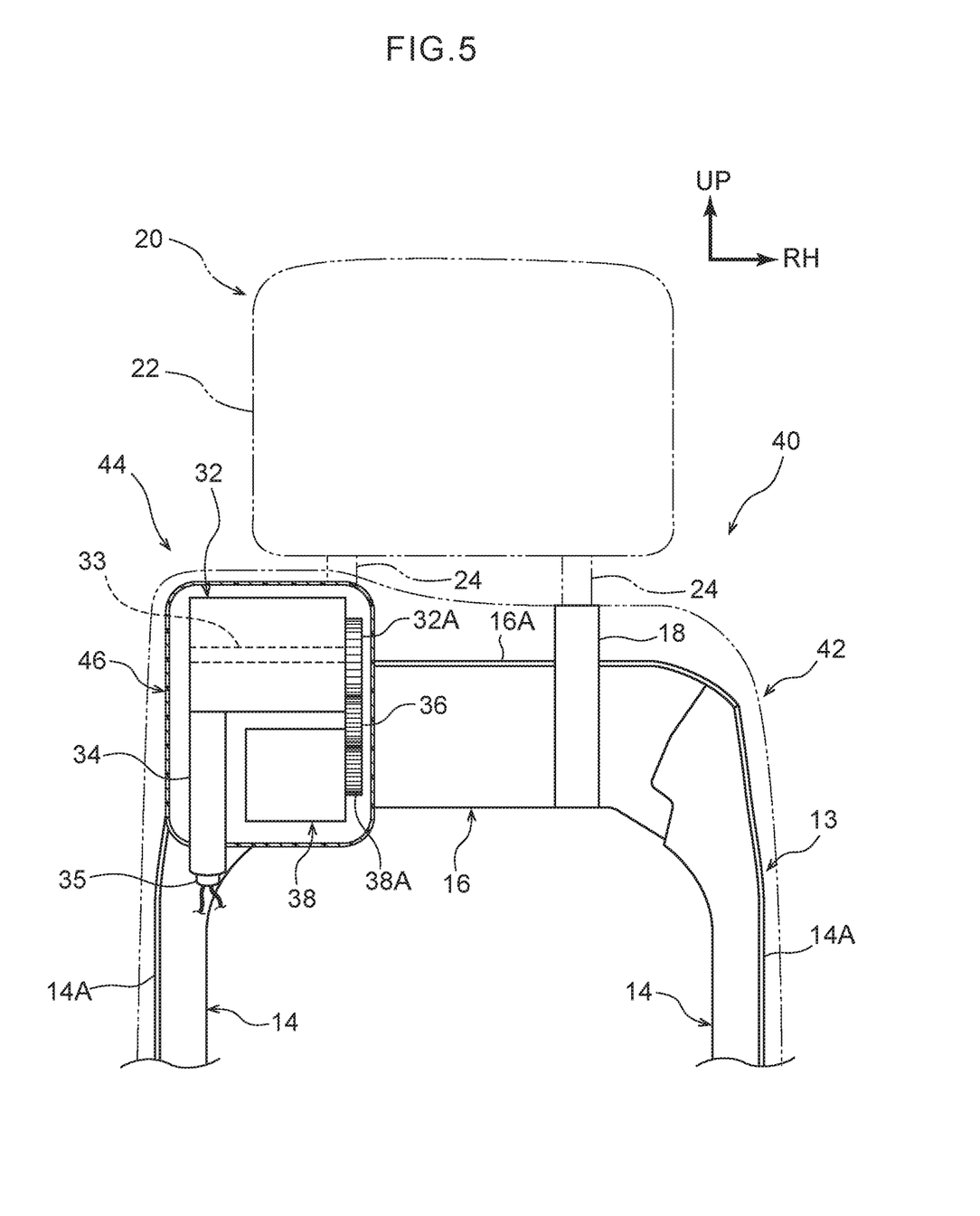
FIG. 5 is a magnified rear view showing a state in which the principal elements of the vehicle seat according to the second exemplary embodiment are seen in a partial cutaway from a rear side.

As shown in FIG. 4 and FIG. 5, a vehicle seat 40 according to the present exemplary embodiment includes a seat back 42. The seat back 42 is provided with the seat back frame 13, which is a frame that forms a framework of the seat back 42. The seat back frame 13 includes the left and right pair of side frames 14 and the upper frame 16 that connects the upper end portions of the side frames 14 in the seat width direction.

A seatbelt apparatus 44 is provided at the seat back frame 13. The seatbelt apparatus 44 according to the present exemplary embodiment principally includes a case 46, the motor 38, the linking gear 36, the retractor 31 that serves as the take-up device, and the pre-tensioner component 34.

The case 46 is disposed at the back face B side of the upper end portion of the seat back frame 13. The case 46 is formed substantially in a box shape including a front wall portion 46A, a lower wall portion 46B, a rear wall portion 46C and an upper wall portion 46D. The motor 38 is disposed in a lower end portion of the interior of the case 46. The motor side gear 38A is mounted to the seat right side of the motor 38. Thus, when the motor 38 drives, the motor side gear 38A rotates around the output shaft.

The motor side gear 38A meshes with the linking gear 36. The linking gear 36 is provided in a seat vertical direction central portion of the interior of the case 46. The linking gear 36 is arranged along the seat back frame 13 adjacent to the motor 38. That is, the linking gear 36 is disposed at the seat upper side of the motor 38 and is rotatably mounted to the case 46.

The linking gear 36 meshes with the retractor side gear 32A of the retractor 31. The retractor 31 is arranged along the seat back frame 13 adjacent to the linking gear 36 at the seat upper side of the linking gear 36. The retractor 31 includes the spool 32 and the torsion bar 33 that serves as the force limiter component.

The pre-tensioner component 34 is arranged along the seat back frame 13 adjacent to the retractor 31. To be specific, the pre-tensioner component 34 is formed in the substantially circular rod shape with the length direction in the seat vertical direction, and is arranged along the back face B of the seat back frame 13. The upper end portion of the pre-tensioner component 34 is connected to the spool 32 of the retractor 31, and the lower end portion of the pre-tensioner component 34 is connected to the connector 35.

In the present exemplary embodiment as described above, the motor 38, the linking gear 36, the retractor 31 and the pre-tensioner component 34 are disposed to be arrayed in the seat vertical direction at the back face B side of the seat back frame 13.

—Operations—

Now, operations of the present exemplary embodiment are described.

In the vehicle seat 40 according to the present exemplary embodiment, the motor 38, the linking gear 36, the retractor 31 and the pre-tensioner component 34 may be made more distant from a seat occupant than in a structure in which these components are disposed at the front face F side of the seat back frame 13. As a result, transmission to the seat occupant of vibrations and noise produced from the motor 38, the linking gear 36 and the retractor 31 may be suppressed. Therefore, while flexibility in aesthetic design is assured, comfort of a seat occupant may be excellently maintained. Other operations are the same as in the first exemplary embodiment.

=Third Exemplary Embodiment=

Now, a third exemplary embodiment of the present disclosure is described with reference to FIG. 6 and FIG. 7. Structures and operations that are basically the same as in the first exemplary embodiment are assigned the same reference symbols as in the first exemplary embodiment and are not described.

Figure 6:
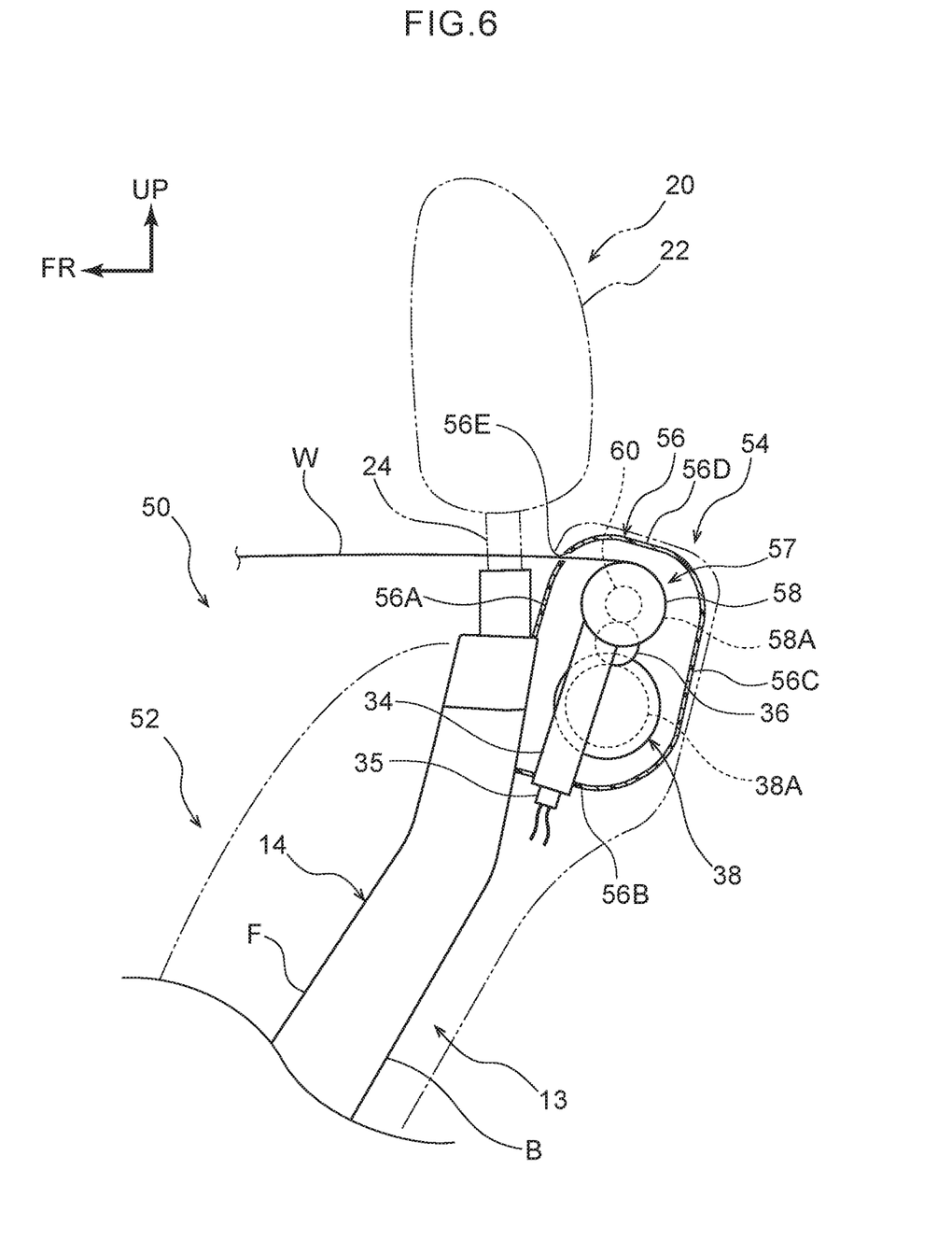
FIG. 6 is a magnified side view showing a state in which the principal elements of a vehicle seat according to a third exemplary embodiment are seen in a partial cutaway in the seat width direction.
Figure 7:
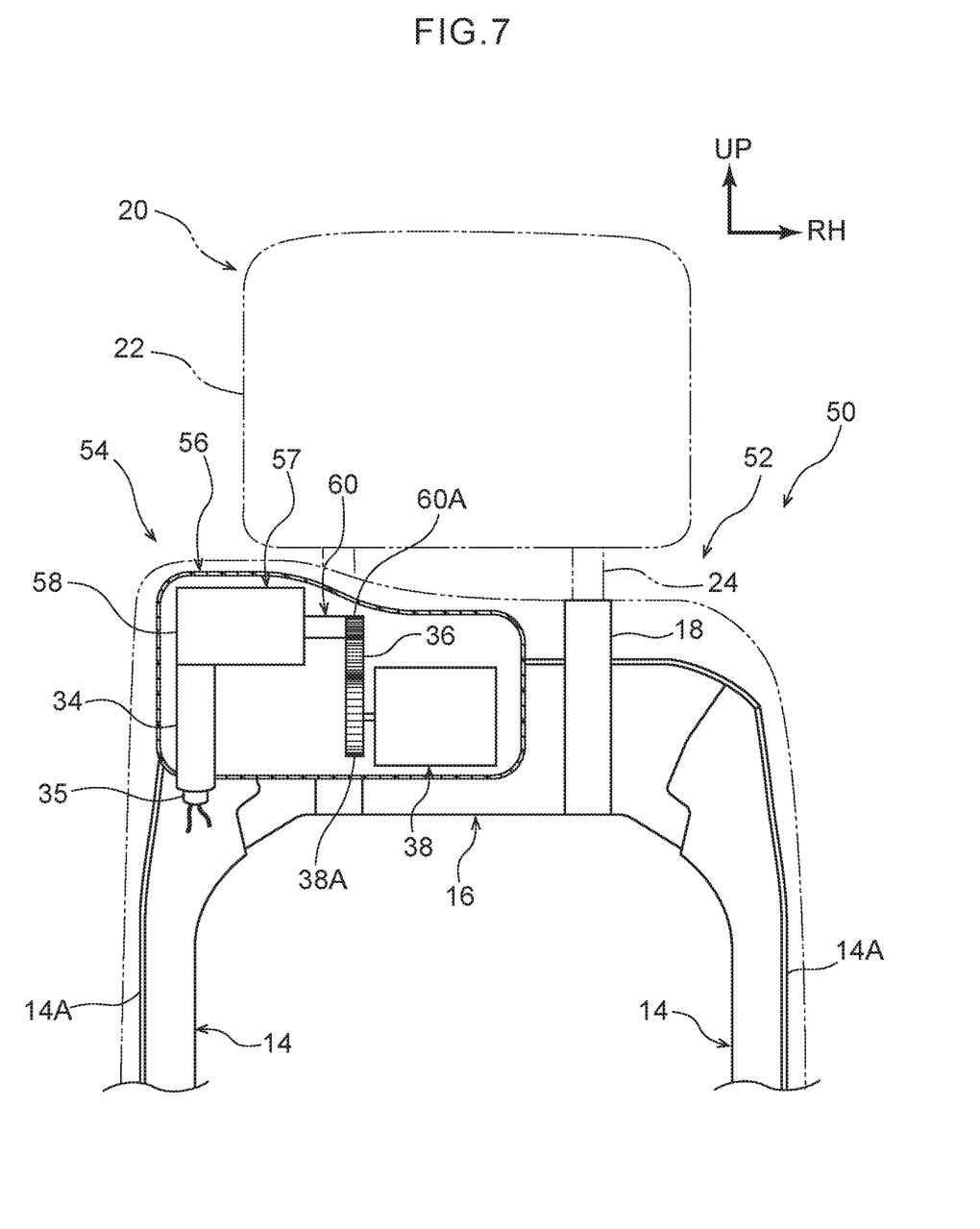
FIG. 7 is a magnified rear view showing a state in which the principal elements of the vehicle seat according to the third exemplary embodiment are seen in a partial cutaway from the rear side.

As shown in FIG. 6 and FIG. 7, a vehicle seat 50 according to the present exemplary embodiment includes a seat back 52. The seat back 52 is provided with the seat back frame 13, which is a frame that forms a framework of the seat back 52. The seat back frame 13 includes the left and right pair of side frames 14 and the upper frame 16 that connects the upper end portions of the side frames 14 in the seat width direction.

A seatbelt apparatus 54 is provided at the seat back frame 13. The seatbelt apparatus 54 according to the present exemplary embodiment principally includes a case 56, the motor 38, the linking gear 36, a retractor 57 that serves as the take-up device, and the pre-tensioner component 34.

The case 56 is disposed at the back face B side of the upper end portion of the seat back frame 13. The case 56 is formed substantially in a box shape including a front wall portion 56A, a lower wall portion 56B, a rear wall portion 56C and an upper wall portion 56D. The case 56 is formed to be longer in the seat width direction than the case 28 of the first exemplary embodiment and the case 46 of the second exemplary embodiment.

The motor 38 is disposed in a lower end portion of the interior of the case 56. The motor side gear 38A is mounted to the seat right side of the motor 38. Thus, when the motor 38 drives, the motor side gear 38A rotates around the output shaft.

The motor side gear 38A meshes with the linking gear 36. The linking gear 36 is disposed at the seat upper side of the motor 38 and is rotatably mounted to the case 56. A torsion bar 60 that structures the retractor 57 serves as the force limiter component. The linking gear 36 meshes with a retractor side gear 60A formed at the torsion bar 60.

The retractor 57 is arranged along the seat back frame 13 adjacent to the linking gear 36, at the seat upper side of the linking gear 36. The retractor 57 includes a spool 58 and the torsion bar 60.

The spool 58 is formed in a substantially circular tube shape with the axial direction in the seat width direction. The spool 58 is rotatably mounted at the case 56. The webbing W is wound onto an outer periphery face of the spool 58. From the spool 58, the webbing W is pulled out through an aperture portion 56E of the case 56 toward the seat front side.

The torsion bar 60 extends to the seat right side from an end portion at the seat right side of the spool 58. That is, the torsion bar 60 is arranged along the seat back frame 13 adjacent to the spool 58. An end portion at the seat left side of the torsion bar 60 is connected to the spool 58. The retractor side gear 60A is formed at an end portion at the seat right side of the torsion bar 60. The retractor side gear 60A meshes with the linking gear 36.

The pre-tensioner component 34 is arranged along the seat back frame 13 adjacent to the retractor 57. To be specific, the pre-tensioner component 34 is formed in the substantially circular rod shape with the length direction in the seat vertical direction, and is arranged along the back face B of the seat back frame 13. The upper end portion of the pre-tensioner component 34 is connected to the spool 58 of the retractor 31, and the lower end portion of the pre-tensioner component 34 is connected to the connector 35.

In the present exemplary embodiment as described above, the motor 38, the linking gear 36, the retractor 57 and the pre-tensioner component 34 are disposed to be arrayed in the seat width direction at the back face B side of the seat back frame 13.

—Operations—

Now, operations of the present exemplary embodiment are described.

In the vehicle seat 50 according to the present exemplary embodiment, left and right bulges of the seat back 52 may be made more similar in size than in a structure in which the motor 38, linking gear 36 and retractor 57 are gathered at one side in the seat width direction of the seat back frame 13. As a result, design of the seat back 52 is more likely to have left-right symmetry.

According to the present exemplary embodiment, the external shape of the spool 58 (the retractor 57) may be made smaller than in a structure in which the spool 58 and the torsion bar 60 are integrated in the retractor 57. As a result, a bulge caused by the retractor 57 in the seat back 52 may be made smaller. Thus, flexibility in aesthetic design may be improved compared to a structure in which the spool 58 and torsion bar 60 are integrated. Other operations are the same as in the first exemplary embodiment.

Vehicle seats according to the first to third exemplary embodiments are described above, but it will be clear that numerous modes may be embodied within a scope not departing from the gist of the present disclosure. For example, the seatbelt apparatus is provided at the left side of the seat back in the above exemplary embodiments, but this is not limiting. The seatbelt apparatus may be provided at the right side of the seat back, in which case the shoulder belt (webbing) is pulled out from the right side of the seat back.

In the above exemplary embodiments, the pre-tensioner component 34 is disposed at the back face B side of the seat back, but this is not limiting. The pre-tensioner component 34 may be disposed at the front face F side of the seat back. In this case, transmission of heat to the seat occupant may be suppressed by providing a thermal insulation material or the like between the pre-tensioner component 34 and the seat occupant.

In the exemplary embodiments described above, the torsion bar that serves as the force limiter component is provided, but this is not limiting. A force limiter component other than a torsion bar may be employed, provided the force limiter component has the function of limiting restraining force from the webbing. Further, a retractor that is not equipped with a force limiter component may be employed.

What is claimed is:

1. A vehicle seat, comprising:
    a seat back extending in a seat vertical direction and supporting a dorsal region of a seat occupant;
    a motor mounted to an upper portion of a seat back frame configuring a framework of the seat back;
    a gear arranged along the seat back frame adjacent to the motor, the gear transmitting driving force from the motor;
    a take-up device arranged along the seat back frame adjacent to the gear, the take-up device being provided with a spool onto which a webbing is wound, and driving force from the motor being transmitted to the take-up device via the gear; and
    a pre-tensioner component arranged along the seat back frame adjacent to the take-up device, the pre-tensioner component forcibly rotating the spool when activated, wherein:
    the motor is disposed at a front face side of the seat back frame, and
    the take-up device and the pre-tensioner component are disposed at a back face side of the seat back frame.

2. A vehicle seat, comprising:
    a seat back extending in a seat vertical direction and supporting a dorsal region of a seat occupant;
    a motor mounted to an upper portion of a seat back frame configuring a framework of the seat back;
    a gear arranged along the seat back frame adjacent to the motor, the gear transmitting driving force from the motor;
    a take-up device arranged along the seat back frame adjacent to the gear, the take-up device being provided with a spool onto which a webbing is wound, and driving force from the motor being transmitted to the take-up device via the gear; and
    a pre-tensioner component arranged along the seat back frame adjacent to the take-up device, the pre-tensioner component forcibly rotating the spool when activated, wherein:
    the motor, the gear, the take-up device and the pre-tensioner component are disposed in the seat vertical direction at a back face side of the seat back frame.

3. The vehicle seat according to claim 2, further comprising:
    a force limiter component provided at the take-up device, the force limiter component limiting a restraining force from the webbing.

4. The vehicle seat according to claim 3, wherein the force limiter component is a torsion bar mounted in a core of the spool, and the torsion bar is configured to deform by twisting in association with a rotation of the spool.

5. The vehicle seat according to claim 2, wherein the pre-tensioner component is formed in a substantially circular rod shape with a length direction in the seat vertical direction, and is arranged along the back face of the seat back frame.

6. The vehicle seat according to claim 2, wherein the motor, the gear and the take-up device are disposed, in this order, from a seat lower side toward a seat upper side.

7. A vehicle seat, comprising:
    a seat back extending in a seat vertical direction and supporting a dorsal region of a seat occupant;
    a motor mounted to an upper portion of a seat back frame configuring a framework of the seat back;
    a gear arranged along the seat back frame adjacent to the motor, the gear transmitting driving force from the motor;
    a take-up device arranged along the seat back frame adjacent to the gear, the take-up device being provided with a spool onto which a webbing is wound, and driving force from the motor being transmitted to the take-up device via the gear; and
    a pre-tensioner component arranged along the seat back frame adjacent to the take-up device, the pre-tensioner component forcibly rotating the spool when activated, wherein:
    the motor, the gear and the take-up device are disposed in a seat width direction at a back face side of the seat back frame.

8. The vehicle seat according to claim 7, further comprising:
    a force limiter component provided at the take-up device, the force limiter component being configured to limit a restraining force from the webbing.

9. The vehicle seat according to claim 8, wherein
    the force limiter component is a torsion bar mounted in a core of the spool, and
    the torsion bar is configured to deform by twisting in association with a rotation of the spool.

10. The vehicle seat according to claim 7, wherein the pre-tensioner component is formed in a substantially circular rod shape with a length direction in the seat vertical direction, and is arranged along the back face of the seat back frame.

11. The vehicle seat according to claim 7, wherein the motor, the gear and the take-up device are disposed, in this order, from a seat width direction inner side toward a seat width direction outer side.

12. The vehicle seat according to claim 1, further comprising:
    a force limiter component provided at the take-up device, the force limiter component limiting a restraining force from the webbing.

13. The vehicle seat according to claim 12, wherein
    the force limiter component is a torsion bar mounted in a core of the spool, and
    the torsion bar is configured to deform by twisting in association with a rotation of the spool.

14. The vehicle seat according to claim 1, wherein the motor, the gear and the take-up device are disposed, in this order, from a seat front side toward a seat rear side.

15. The vehicle seat according to claim 1, wherein the pre-tensioner component is formed in a substantially circular rod shape with a length direction in the seat vertical direction, and is arranged along the back face of the seat back frame.

* * * * *